United States Patent [19]
Chichester

[11] 4,366,671
[45] Jan. 4, 1983

[54] HYDROSTATIC TRANSMISSION

[75] Inventor: Willard L. Chichester, Battle Creek, Mich.

[73] Assignee: Clark Equipment Company, Buchanan, Mich.

[21] Appl. No.: 130,578

[22] Filed: Mar. 14, 1980

[51] Int. Cl.³ .............................................. F16H 39/46
[52] U.S. Cl. .................................. 60/444; 60/458; 60/492; 60/488; 180/307; 417/506
[58] Field of Search ............... 60/443, 444, 458, 487, 60/488, 490, 491, 492; 180/307; 417/506

[56] References Cited

U.S. PATENT DOCUMENTS

| | | | |
|---|---|---|---|
| 925,148 | 6/1909 | Williams | 60/490 |
| 1,354,592 | 10/1920 | Bair | 60/488 |
| 2,265,314 | 12/1941 | Rose | 60/444 X |
| 2,662,375 | 12/1953 | Postel et al. | 60/490 X |
| 2,872,876 | 2/1959 | Thoma | 60/490 X |
| 3,040,532 | 6/1962 | Thoma et al. | 60/444 |
| 3,055,685 | 9/1962 | Ensinger . | |
| 3,107,491 | 10/1963 | Kaup et al. | 60/487 X |
| 3,135,093 | 6/1964 | Hoffman | 60/490 |
| 3,367,105 | 4/1968 | Dowty | 60/490 X |
| 3,370,424 | 2/1968 | Swanson . | |
| 3,372,545 | 3/1968 | Hyde | 60/487 |
| 3,404,584 | 10/1968 | Trautmann | 60/487 |
| 3,486,335 | 12/1969 | Kern et al. | 60/488 |
| 3,530,839 | 9/1970 | Avrea | 285/370 |
| 3,643,433 | 2/1972 | Widmaier | 60/492 |
| 3,739,691 | 6/1973 | Bobier | 91/506 |
| 3,744,343 | 7/1973 | Helmer et al. | 285/370 |
| 3,779,137 | 12/1973 | Koivunen | 91/506 |
| 3,788,773 | 1/1974 | Van der Kolk | 60/444 X |
| 3,834,164 | 9/1974 | Ritter | 60/492 |
| 3,993,334 | 11/1976 | Fridman et al. | 285/334 |

FOREIGN PATENT DOCUMENTS

284788  1/1965  Netherlands ......................... 60/487

Primary Examiner—George L. Walton
Attorney, Agent, or Firm—Marmaduke A. Hobbs

[57] ABSTRACT

A hydrostatic transmission in which a hydraulic pump and motor are in a generally U-shaped arrangement with a fluid transfer manifold extending between the pump and the motor. The pump is driven on one side of the manifold by the drive motor of the vehicle on which the transmission is used, and a drive shaft from the motor extends through the manifold, to power the drive wheels on the other side of the manifold. A housing surrounds the pump, motor and manifold and contains hydraulic fluid for the operation of the transmission. Servo controls for the pump and motor are located on the outside of the housing, and a control cover has preloaded servo pistons which properly adjust the servo control when the cover is attached to the housing. A charge pump for the servo controls is in the manifold, and rigid tubular conduits extend between the charge pump and the control cover. The conduits are mounted between, and held in place by, the charge pump and control cover, and require no hydraulic fittings or connections to secure them therebetween.

15 Claims, 5 Drawing Figures

HYDROSTATIC TRANSMISSION

Hydrostatic transmissions may be used in place of mechanical transmissions on many vehicles, including industrial trucks such as fork lift trucks and the like. Through the elimination of cogs, sprockets and gear trains, the likelihood of mechanical failure is substantially less for a hydrostatic transmission than for a mechanical transmission. Although mechanical problems have been reduced by the use thereof, certain disadvantages have existed in the use of hydrostatic transmissions. The cost of assembling a hydrostatic transmission has been high, and these costs have represented a significant portion of the purchase price of a vehicle on which the transmission is used. Thus, a reduction in hydrostatic transmission assembly costs will result in a significant overall reduction in the cost of a vehicle. Although the expense for production can be reduced somewhat by changes in the components used in the transmission, the potential savings therefrom are small, particularly since the greatest single cost factor in the assembly of a transmission is the labor involved for assembly. Therefore, a simplified design for a transmission, which reduces the amount of labor required for assembly, can be the most significant factor in reducing the cost of a transmission.

Normally, hose type hydraulic lines are used to transfer hydraulic fluid between various components of the transmission. Hydraulic hose fittings are required at each end of the hydraulic line, and, in addition to being a significant source of labor expense for the attachment thereof, the clamp connections are also a source of potential transmission failure in that, if a connection becomes loose, leakage of the transmission fluid may occur. An improved transmission, having hydraulic fluid conduits which fit in sealing relationship between the various transmission components without the use of clamps or fittings, would substantially reduce the cost for assembling the transmission, as well as reduce the potential for transmission failure.

The servo controls for the pumps and motors in hydrostatic transmissions have required adjustment during assembly and readjustment thereafter, hence adding to the maintenance costs of the transmission and creating a source of potential transmission inefficiency. Preloaded, self-centering servo pistons and levers, which automatically adjust the transmission to neutral during the assembly thereof, will eliminate the adjustment and readjustment previously required, and will result in a less expensive, yet more reliable, transmission. In previous designs, the control components have been located in the pump or motor housings and, as a result thereof, design flexibility is substantially minimized. The linkage connections between the various control components have also been a source of transmission failure. Normally, the control linkage elements are connected mechanically by bolts or the like, and the vibration created by the piston type pumps normally used in hydrostatic transmissions is transmitted through the linkage connections, often resulting in excessive wear at the connections. Elimination of the mechanical connections between linkage elements will eliminate a source of transmission failure, and will reduce the amount of vibration transmitted from the transmission to the remainder of the vehicle. Previous hydrostatic transmissions have utilized a pump and two motors, and the noise from the rotating groups has been higher than desirable. Adequate means for inexpensively suppressing the noise have not existed, and some of the previous designs have been bulky, requiring more room than mechanical transmissions.

It is therefore one of the principal objects of the present invention to provide a hydrostatic transmission which has a simplified design and method of assembly, to reduce the amount of labor needed for assembly and thereby lower the costs of producing the transmission, and which eliminates cogs and gears of conventional mechanical transmissions, replacing them with a hydraulic pump and motor to reduce potential mechanical failures.

Another object of the present invention is to provide a hydrostatic transmission which has hydraulic fluid conduits that fit in sealing relationship between transmission components without the use of clamps or fittings, thereby reducing the potential for hydraulic leaks, and which is self adjusting when assembled and eliminates the need for field adjustment and the potential for misadjustment.

A further object of the present invention is to provide a hydrostatic transmission which serves as the hydraulic fluid reservoir and also as a structural support member in the vehicle, and which substantially reduces the noise from the rotating groups by a simple inexpensive means without adding significantly to the overall size of the transmission.

Yet another object of the present invention is to provide a hydrostatic transmission which is compact, requiring no more space than mechanical transmissions, and which has a pump and motor arrangement permitting each to move relatively freely in respect to each other during operation of the transmission.

A still further object of the present invention is to provide a hydrostatic transmission which eliminates the mechanical connections in the servo control linkage so that the vibration from the hydraulic pump is not transmitted through the servo pistons, and which has design flexibility in the location of the servo controls and levers.

Additional objects and advantages of the present invention will become apparent from the following detailed description and the accompanying drawings, wherein:

Figure 1:
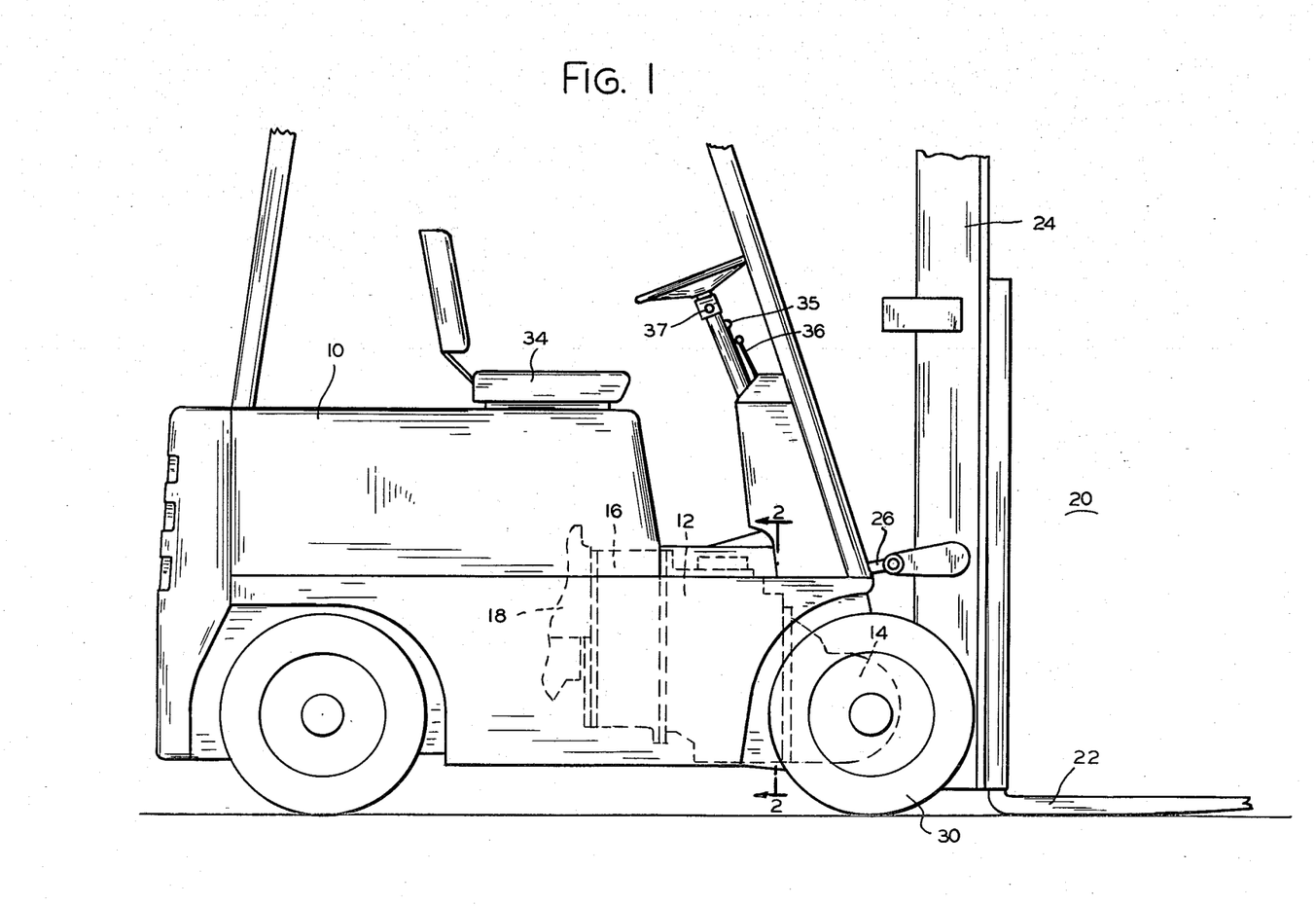
FIG. 1 is a side elevational view of a fork lift truck which has a hydrostatic transmission embodying the present invention.

Referring more specifically to the drawings, and to FIG. 1 in particular, numeral 10 designates an industrial fork lift truck having a hydrostatic transmission 12 which is rigidly mounted between a front drive axle assembly 14 and a flywheel assembly 16 of a drive motor 18. The direct, rigid mounting of transmission 12 between drive axle assembly 14 and flywheel assembly 16 enables the drive train comprising the aforementioned assemblies to serve as a structural support member for the fork lift truck. Additionally, the close coupled construction enables the fork lift truck to be built on a shorter wheel base than would be possible if the assemblies were only indirectly coupled.

Truck 10, which is described herein as merely one of the many suitable uses for the present hydrostatic transmission, has a tiltable upright assembly 20 on the front thereof, which includes forks 22 and a vertical carriage structure 24. The upright assembly 20 may be pivoted about a horizontal axis by tilt cylinders 26 and 28. The truck is driven by motor 18, which powers drive wheels 30 and 32 at the front of the truck. An operator's seat 34 is provided, as are control levers 35, 36 and 37, shown in FIG. 1, for operation of the truck.

Transmission 12 has an outer case or housing 40 which is bolted to a front drive axle housing 42 of axle assembly 14, and to a flywheel housing 44 of flywheel assembly 16, housings 40, 42 and 44 thus forming a structural support member for the drive train, between the drive motor and the front drive wheels. Within housing 40 are a hydraulic pump 46, a hydraulic motor 48 and a manifold 50. To minimize the overall size of the transmission, pujmp 46, motor 48 and manifold 50 are placed in a U-shaped arrangement, with the manifold being disposed between the pump and the motor for the transfer of hydraulic fluid therebetween. A servo control assembly 52, for regulating the pump and motor displacements, is located on the outside of housing 40, hence providing design flexibility in the location of the control levers for the pump and motor.

Pump 46 of the present transmission is preferably a variable displacement pump, which may be adjusted for either forward or reverse operation of the vehicle by selecting one or the other. Motor 48 of transmission 12 is preferably a variable speed motor, having at least two speeds which may be selected, either full stroke for low speed operation, or half stroke for high speed operation. The pump and motor of the present transmission may be of any conventional types which meet the requirements set out above and are otherwise suitable for use in hydrostatic transmission. The piston types with swash plate adjustment are used extensively in transmissions and work well with the present transmission. The use of a variable speed motor eliminates the need for two hydraulic motors, which were commonly used in previous transmissions, thus reducing the size of the transmission, as well as the overall cost for the production thereof.

Figure 3:
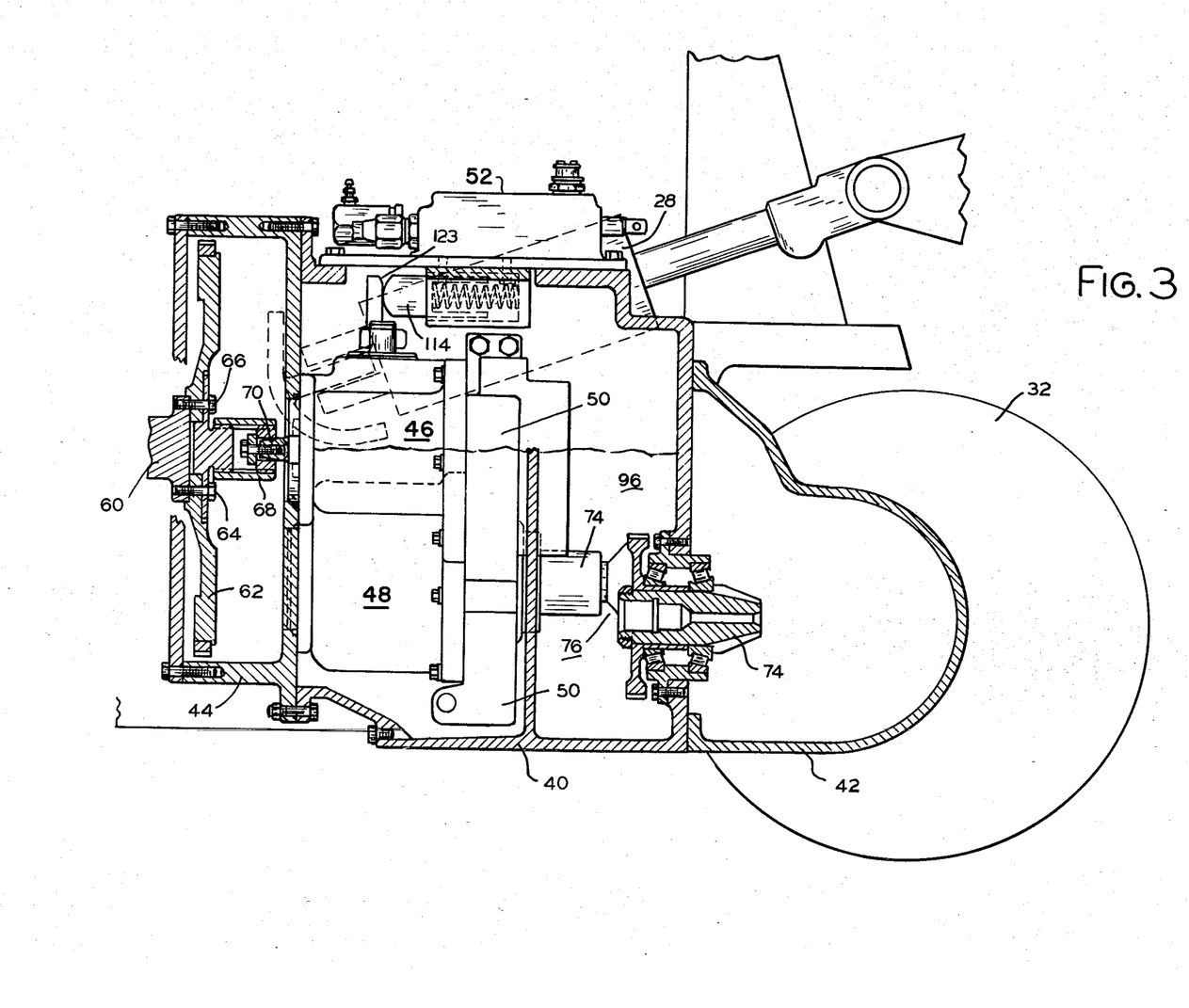
FIG. 3 is a cross sectional view of the hydrostatic transmission shown in FIG. 2, taken along line 3—3 of the latter figure.

The U-shaped arrangement of pump 46, motor 48 and manifold 50, as seen in FIG. 3, permits transmission 12 to be driven from the rear of the vehicle and to provide power to drive wheels 30 and 32 at the front of the vehicle, while requiring only a minimum amount of space. A drive shaft 60 from the drive motor of the vehicle is secured to a flywheel 62 by bolts 64 and 66, and a drive shaft 70 of pump 46 is connected by a drive coupling 68 to flywheel 62. Thus, the power from the drive motor is transmitted to pump 46, and is converted by the pump to hydraulic power, which is transmitted through manifold 50 to motor 48. Within manifold 50 are the control mechanisms, such as a charge pump 72 for servo control assembly 52, crossover relief valves, replenishing checks, high pressure conduits and the like. The types of mechanisms required in manifold 50 will be apparent to one skilled in the art and, except for the novel variations to be described subsequently, will not be explained more fully herein.

The hydraulic power transmitted from pump 46 through manifold 50 to hydraulic motor 48 is converted by the motor back to torque, and the motor, having a drive shaft 74 which extends through manifold 50, may be connected by an appropriate coupling 76 to a gear train, differential or the like within drive axle housing 42, to drive wheels 30 and 32. Hence, the torque from the driver motor is used to drive the hydraulic pump, the pump converts the power to hydraulic power which is then transmitted through manifold 50 to hydraulic motor 48, and the motor converts the hydraulic power back to torque for driving the vehicle. The transfer of the power from the drive motor to the drive wheels is accomplished in a minimal amount of space because of the U-shaped arrangement of the pump, motor and manifold. Additionally, since the pump and motor are connected to their operating mechanism in opposite directions, that is, the pump is connected rearwardly and the motor forwardly, each can move and vibrate independently, with little interference from the other. If spline connections are used between the flywheel and pump and between the motor and gear train, the amount of vibration transmitted from the transmission to the vehicle is substantially reduced.

To further reduce both vibration and noise from transmission 12, housing 40 is used as the transmission fluid reservoir. A filler tube 90, having a dip stick 92 therein, is provided in housing 40, together with a breather 94 and other appropriate connections to filters, coolers and the like as required. Housing 40 is filled with appropriate transmission fluid 96 to substantially cover pump 46 and motor 48. The submergence of the transmission rotating groups in the hydraulic fluid effectively suppresses the noise emanating therefrom.

Figure 2:
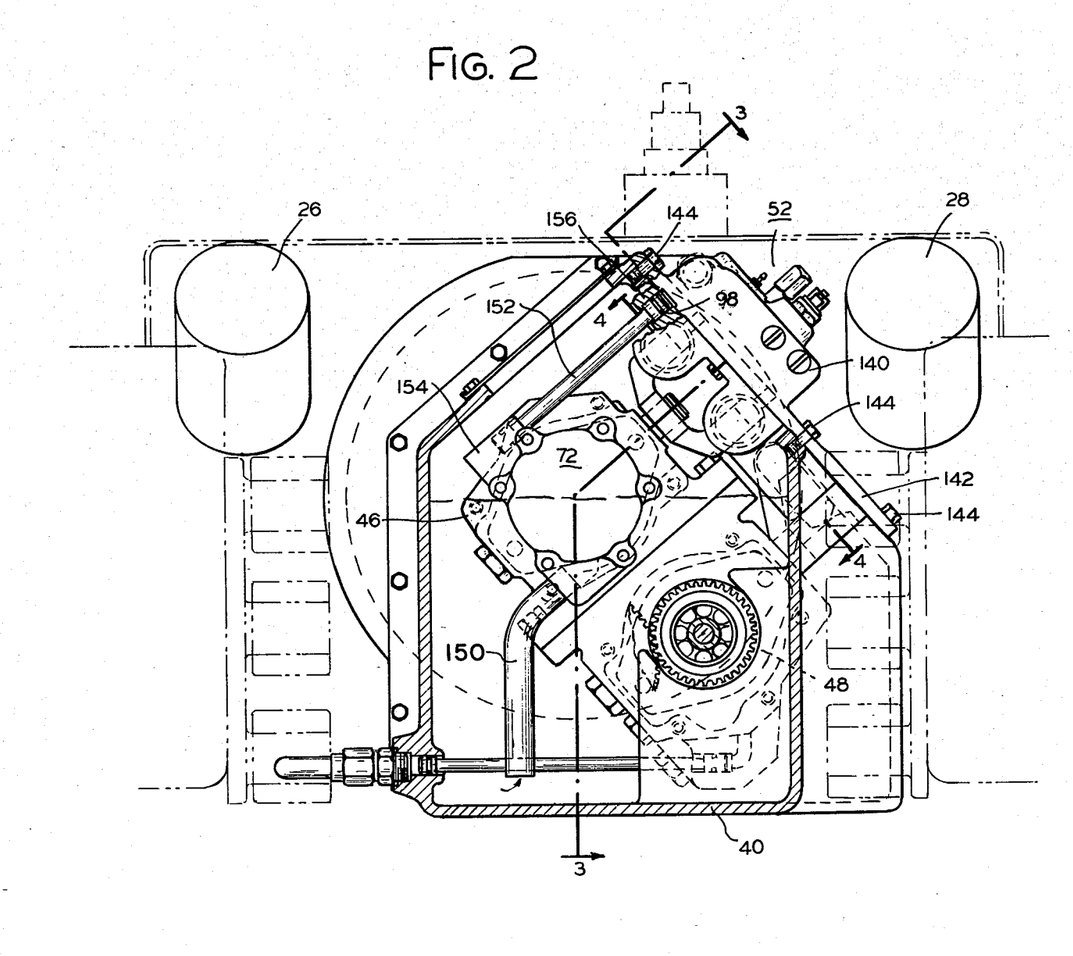
FIG. 2 is a cross sectional view of the hydrostatic transmission on the fork lift truck shown in FIG. 1, taken on line 2—2 of the latter figure.
Figure 4:
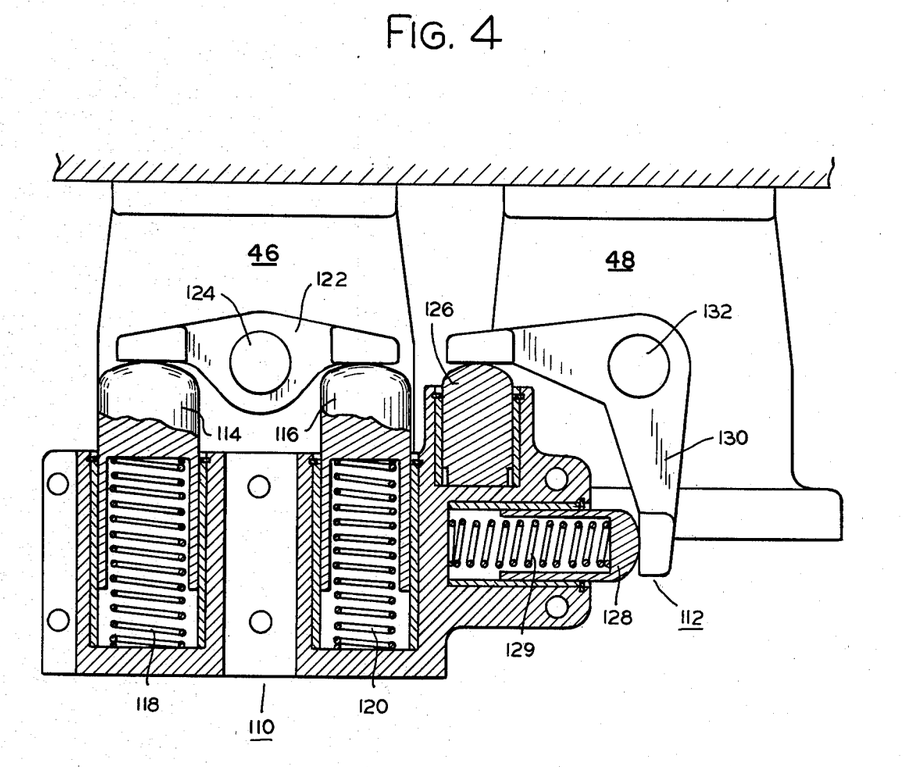
FIG. 4 is an enlarged cross sectional view of the servo piston control for the hydrostatic transmission shown in FIG. 2, taken on line 4—4 of the latter figure.
Figure 5:
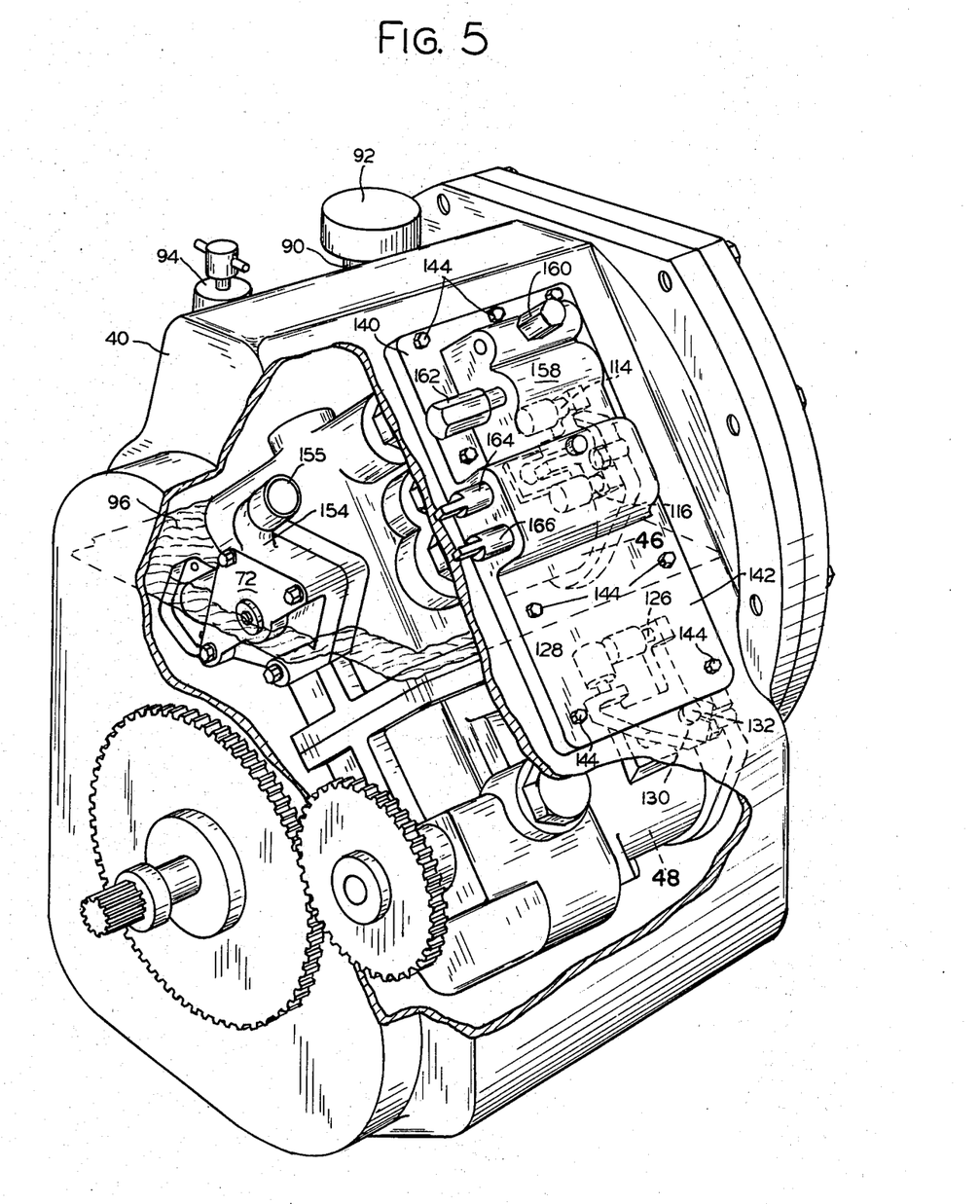
FIG. 5 is a perspective view, partially broken away, of the present hydrostatic transmission.

Servo control assembly 52, shown in FIG. 2, includes a pump servo control 110 and a motor servo control 112 which are connected to, and control the positioning of, the swash plates of the pump and motor. Pump servo control 110, as seen in FIG. 4, includes a pair of round nose, short stroke control pistons 114 and 116 which are biased by springs 118 and 120, respectively. A pump lever 122, having angled face portions 123, is disposed between and butts against the ends of pistons 114 and 116. The pump lever is attached to a shaft 124 which extends into pump 46 and is attached to the swash plate of the pump, to adjust the position of the swash plate. By pressurizing one or the other of pistons 114 and 116, pump lever 122 is turned, thereby rotating shaft 124 to adjust the swash plate in pump 46. If neither piston 114 nor piston 116 is pressurized, springs 118 and 120 hold the pistons in a position such that the pump will be at zero displacement and the transmission in neutral.

The motor servo control 112 includes a round nose, short stroke, servo actuator piston 126, and a round nose return piston 128 biased by a spring 129. An angular motor lever 130 is disposed between, and butts against, pistons 126 and 128 and is attached to a shaft 132 which extends into motor 48 to the motor swash plate. Hence, adjustment of servo actuator piston 126 will move lever 130 and rotate shaft 132, thereby adjusting the motor swash plate. Spring actuated return piston 128 controls the position of lever 130 when piston 126 is not pressurized, placing the motor in full displacement.

Pistons 114, 116, 126 and 128 are disposed in a servo control cover 140 which is a portion of a housing cover 142 held on housing 40 by a plurality of bolts 144. The angled face portions 123 on the levers will come in contact with the pistons as the cover is being lowered onto housing 40, and the pistons will slide down to assume the proper assembled position, wherein the piston heads butt against the pump and motor levers. Since the pistons are assembled in servo control cover 140 with the biasing springs 118, 120 and 129, the unpressurized pistons assume preloaded positions. Hence, as cover 142 is positioned and the pistons in the servo cover portions thereof slide into place against the pump lever and motor lever, the levers are moved so that pump lever 122 is at the zero displacement position, wherein the transmission is in neutral, and motor lever 130 is moved to the position wherein motor 48 is at maximum displacement. The preloading of the pistons by the springs eliminates the need for adjustment after assembly, in that the springs will hold the pistons in proper adjustment, the adjustment screws, normally found on the servo piston rods, having thus been eliminated. The use of a dual piston control and the arrangement of the pump and motor levers between the pistons, provide a more compact arrangement than previous servo controls which used a single piston. For example, an eighteen degree tilt of pump lever 122 in either direction from the neutral position will provide adequate swash plate movement for selection of forward or reverse drive. A single piston assembly would require a piston or nearly double the stroke length of the dual pistons, to effectuate the same amount of swash plate movement.

As previously described, charge pump 72 for servo controls 110 and 112 is located in manifold 50, and the servo controls are located outside of housing 40; hence, conduits are necessary to transmit hydraulic fluid from the reservoir to charge pump 72, and from the charge pump to the servo control pistons. The present transmission utilizes rigid tubular conduits made of metal, which require no hydraulic fittings, thus substantially reducing the assembly costs of the transmission. Conduit 150 is used for transmitting hydraulic fluid from the reservoir to charge pump 72, and a second conduit 152 is used for transmitting the fluid from the charge pump to the servo controls. Each of the conduits is sealed between milled surfaces on the components of the transmission between which the conduit extends. For example, a member 154 on charge pump 72 is provided with a port 155 into which conduit 152 is inserted. Servo control cover 140 is provided with a similar member 156. During assembly of the transmission, conduit 152 is inserted through an opening in housing 40 and into port 155. When housing cover 142 is attached to the housing, member 156 will receive the other end of conduit 152, and the conduit will be held rigidly between charge pump 72 and cover 142. O-rings may be disposed near the ends of conduit 152 to provide a further seal around the conduit. A flow means 158 in servo control cover 140 controls the amount of fluid which will flow into any of the cylinders in which pistons 114, 116, 126 and 128 are disposed. The adjustment of the flow means is made by control levers 35 and 36 shown in FIG. 1, connected to adjustment spools 160, 162, 164 and 166 which regulate the fluid flow within flow means 158.

By mounting the servo controls outside of the motor and pump housings, several advantages are obtained, including greater design flexibility in the location of the control levers for the pump and motor. Additionally, in the embodiment shown, the pump lever and motor lever are not connected to the actuating pistons, but merely butt against the surface thereof. Thus, vibrations from pump 46 and motor 48 which may cause the vibration of the motor and pump levers, are not transmitted throughout the vehicle, in that no rigid linkage exists between the levers and the servo pistons. Since the vibrations are not transmitted through rigid linkage connections, much less wear occurs at the connections than would occur if mechanical connections existed.

In the assembly of a hydrostatic transmission embodying the present invention, a substantial cost saving is realized over the cost of assembling previous transmissions. The use of a variable speed motor, which eliminates the need for two hydraulic motors, reduces the number of parts involved in assembling the transmission. The rigid internal hydraulic conduits, which are held between the various transmission components without the use of hydraulic clamps or connectors, create a substantial saving in the hours of labor required to assemble the transmission. In the assembly of previous transmissions, many man hours were consumed because of the difficult arrangement and close working space in which the hydraulic connections had to be made. Properly positioning the necessary clamps, and reaching them with tools to tighten them in place, required substantial amounts of assembly time. In the present transmission, assembly time is substantially less, in that the rigid tubular conduits need only be inserted through openings in transmission housing 40 and into receiving ports such as port 155 in member 154 of charge pump 72 for receiving conduit 152. When cover 142 is placed on the housing, member 156 therein will receive the other end of conduit 152. The person assembling the transmission is not required to work with tools in the confined and unlighted area within the transmission housing, in an attempt to tighten hydraulic fittings. The rigid conduits will not move after the assembly of the transmission has been completed, and the O-rings on the conduits create a seal between the conduit and the fluid port in which the conduit is inserted.

A substantial amount of additional assembly time is saved during the assembly of the servo controls, in that, as housing cover 142 is lowered in place on housing 40, pistons 114, 116, 126 and 128 in the servo control cover portion thereof will contact the angled face portions 123 and slide down to assume the assembled position against the pump and motor levers. As the pistons slide down, the pump and motor levers turn, thereby rotating pump shaft 124 and motor shaft 132. The preloading of the pistons with springs 118, 120 and 129 holds the pistons in positions wherein the pump and motor levers are moved to the positions of proper adjustment when the cover is in its final position on housing 140. Hence, no further adjustment is required and the cumbersome screw type adjustments, normally found on the piston rods of the servo controls of hydrostatic transmissions, have been eliminated.

In the use of a hydrostatic transmission embodying the present invention, the driver of vehicle 10, after starting the vehicle, must decide in which direction he wishes to travel and at what speed. By adjustment of flow means 158 in servo control cover 140, either piston 114 or 116 may be pressurized to turn lever 122 which rotates shaft 124 to adjust the pump swash plate for either forward or reverse operation. When neither cylinder is pressurized, springs 118 and 120 will exert equal force on pistons 114 and 116, respectively, to adjust the pump to zero displacement, thereby placing the transmission in neutral. Spring 129 extends piston 128 when piston 126 is not pressurized so that motor 48 is at maximum displacement. If the driver desires to travel at a slower speed he adjusts a lever connected to the spools of flow means 158 so that pressurized fluid from charge pump 72 will extend piston 126 to turn lever 130. Both high speed low torque and low speed high torque options are available in either forward or reverse drive.

The U-shaped arrangement between pump 46, motor 48 and manifold 50 results in a compact transmission which requires less space than previous hydrostatic transmissions required. The present transmission will operate more quietly than previous transmissions because the rotating components of the transmission, including the swash plates thereof, are substantially submerged in transmission fluid, which deadens the noise therefrom. Less vibration from the present transmission is passed through vehicle 10 than from previous transmissions, because the servo pistons are not rigidly connected to the pump or motor levers, but merely butt thereagainst. Hence, vibrations from the pump or motor may cause the levers to vibrate slightly on the piston heads; however, since no rigid connection exists therebetween, the levers will not transmit substantial amounts of vibration to the other parts of the vehicle. Further, since the swash plates are substantially covered with the hydraulic fluid, much of the vibration therefrom will be absorbed by the fluid and not transmitted throughout the vehicle. Thus, the present transmission is significantly more quiet than previous transmissions and has less vibration than previous transmissions.

Although one embodiment of the hydrostatic transmission has been described in detail herein, various changes may be made without departing from the scope of the present invention.

I claim:

1. A hydrostatic transmission for a vehicle having a drive motor and drive wheels, comprising a hydraulic pump including a shaft for attachment of said transmission to the drive motor of the vehicle, a manifold connected to said pump for receiving hydraulic fluid from said pump, a hydraulic motor connected to said manifold for receiving said hydraulic fluid from said manifold, a drive shaft from said motor for attaching said transmission to the drive wheels, an outer housing enclosing said pump, said motor and said manifold and having an opening with a removable cover, a reservoir for said hydraulic fluid contained in said housing to substantially cover said pump, said motor and said manifold with said fluid, servo controls for adjusting the displacement of said pump and said motor, a charge pump for activating said servo controls, fluid flow means between said charge pump and said servo controls for transmitting pressurized fluid from said charge pump to said servo controls, said servo controls including shafts for adjusting the displacement of said pump and said hydraulic motor, levers connected to said shafts for moving said shafts, servo pistons mounted on said cover and being pressurized by said charge pump for moving said levers, and springs behind said pistons biasing said pistons to a preloaded position, said pistons sliding adjacent said levers to abut same as said cover is placed onto said housing.

2. A hydrostatic transmission as defined in claim 1 in which said pump and said hydraulic motor are both on the same side of said manifold and together form a U-shaped, unitary arrangement with said manifold, and said drive shaft from said hydraulic motor extends through said manifold.

3. A hydrostatic transmission as defined in claim 1 in which said fluid flow means includes a substantially rigid conduit disposed between said charge pump and said servo controls, and ports in said charge pump and said servo controls adapted to receive said conduit.

4. A hydrostatic transmission as defined in claim 2 in which said fluid flow means includes a substantially rigid conduit disposed between said charge pump and said servo controls, ports in said charge pump and said servo controls adapted to receive opposite ends of said conduit, and O-rings disposed on said conduit for providing a seal between said conduit and said ports.

5. A hydrostatic transmission as defined in claim 1 in which said levers have inclined surfaces which angle toward said pistons nearer said housing for encountering said pistons and directing the positioning thereof as said housing cover is lowered onto said housing.

6. A hydrostatic transmission as defined in claim 5 in which said hydraulic motor has two displacement capacities.

7. In a hydrostatic transmission: a hydraulic pump, hydraulic motor, a charge pump, a housing enclosing said pump and motor and having a cover, and a servo control including a first rotatable shaft extending outwardly from said pump and connected to said pump for adjusting the displacement of said pump, a second rotatable shaft extending outwardly from said motor and connected to said motor for adjusting the displacement of said motor, levers on each of said shafts, and said servo control further including power operated means mounted on said cover for engagement with said levers when said cover is placed on said housing for moving said levers to rotate said shafts, said power operated means disengageable from said levers upon removal of said cover.

8. In a hydrostatic transmission: the servo control as defined in claim 7 in which said lever on said first shaft extends laterally in two directions therefrom, and said means for moving said lever includes a piston near each end of said lever having a piston head in contact with said lever.

9. In a hydrostatic transmission: the servo control as defined in claim 8 in which a control cover forming a part of the housing cover encloses said pistons and has a fluid flow means for pressurizing said pistons, and a spring is disposed behind each of said pistons for biasing said pistons to preselected unpressurized positions.

10. In a hydrostatic transmission: the servo control as defined in claim 9 in which said lever on said second shaft extends laterally in two directions therefrom, and said means for moving said lever includes a piston near each end of said lever having a piston head in contact with said lever.

11. In a hydrostatic transmission: the servo control as defined in claim 10 in which said pistons for said lever of said second shaft are disposed in said control cover, a spring is disposed behind one of said pistons for said lever of said second shaft for biasing said piston to a preselected position, and said fluid flow means in said control cover is adjustable to pressurize the other of said pistons for said lever of said second shaft.

12. In a hydrostatic transmission: the servo control as defined in claim 11 in which a rigid tubular conduit extends between said charge pump and said fluid flow means in said control cover for transmitting hydraulic fluid from said charge pump to said fluid flow means, a port is disposed in said charge pump for receiving one end of said conduit, a port is disposed in said cover for receiving the other end of said conduit, and O-rings are disposed on said conduit for providing a seal between said conduit and said ports.

13. In a hydrostatic transmission: the servo control as defined in claim 7 in which said lever on said second shaft extends laterally in two directions therefrom and said means for moving said lever includes a piston near each end of said lever having a piston head in contact with said lever.

14. In a hydrostatic transmission: the servo control as defined in claim 13 in which a control cover forming a part of the housing cover encloses each of said pistons and has fluid flow means for pressurizing one of said pistons, and a spring is disposed behind the other of said pistons for biasing each other piston to a preselected position when said first mentioned piston is not pressurized.

15. In a hydrostatic transmission having a hydraulic pump and a hydraulic motor: a housing surrounding said pump and said motor having a reservoir containing hydraulic fluid for operation of the transmission, a filler tube disposed in said housing, a breather device in said housing, hydraulic fluid in said housing substantially covering the pump and motor, fluid flow means for transmitting said fluid to and from the pump and motor, control shafts extending from said pump and motor, levers attached to each of said shafts, a cover disposed on said housing, servo control disposed in said cover for adjusting the displacements of said pump and said motor, and said servo control including power operated means mounted on said cover for engagement with said levers when said cover is placed on said housing for moving said levers to rotate said shafts.

* * * * *